United States Patent [19]

Blachford

[11] 4,404,828

[45] Sep. 20, 1983

[54] METHOD OF DRAWING A METAL WIRE AND LUBRICANT COMPOSITION THEREFOR

[75] Inventor: John Blachford, Westmount, Canada

[73] Assignee: H. L. Blachford Ltd/Ltee, Montreal, Canada

[21] Appl. No.: 174,652

[22] Filed: Aug. 1, 1980

[51] Int. Cl.³ .................. B21B 45/02; C10M 7/10; C10M 7/28; C10M 7/44
[52] U.S. Cl. .................................. 72/42; 252/10; 428/402.2; 428/402.21
[58] Field of Search .................. 252/316, 10; 72/42

[56] References Cited

U.S. PATENT DOCUMENTS

| | | | |
|---|---|---|---|
| 2,089,883 | 8/1937 | Ellsworth | 72/42 |
| 3,413,832 | 12/1968 | Lang et al. | 72/42 |
| 3,513,943 | 5/1970 | Ernst et al. | 252/10 X |
| 4,002,474 | 1/1977 | Blachford | 75/211 |
| 4,106,932 | 8/1978 | Blachford | 252/316 X |

*Primary Examiner*—Richard D. Lovering
*Attorney, Agent, or Firm*—Bacon & Thomas

[57] ABSTRACT

A lubricant composition for drawing metal wire comprises a lubricant which may be particulate, liquid or semi-liquid and discrete microcapsules having a liquid core, which enhances the wire drawing agent; in particular the liquid core may be an extreme pressure additive or an anti-wear additive; the liquid is released by rupture of the microcapsules in the die so that the liquid is released at the site where it is required.

22 Claims, No Drawings

METHOD OF DRAWING A METAL WIRE AND LUBRICANT COMPOSITION THEREFOR

BACKGROUND OF THE INVENTION (a) Field of the Invention

This invention relates to a lubricant composition for the drawing of wire and to the manufacture and use of such composition.

More particularly, the invention is concerned with a lubricant composition which comprises a lubricant intimately mixed with an additive comprising a microencapsulated liquid.

(b) Description of Prior Art

Metal wire of a desired diameter is generally made by drawing a metal wire or rod of larger diameter, which may typically be about 0.2 ins., more usually about 0.218 ins., through a die or series of dies. As the wire is pulled through a die, it undergoes a reduction in diameter. After the wire has been drawn to a smaller diameter wire, the resulting wire is usually redrawn, frequently several times to smaller and smaller diameter. The force required to pull the wire or rod through a die is very high. Furthermore, it is essential that the wire bear a coating of lubricant before it enters the section of the die which produces the reduction in the diameter, otherwise, one or more of the following will occur: the force to draw the wire will be so high that the wire will break, the die will very rapidly wear away, or the die will be badly burned and thereby destroyed, because of the extreme heat generated. The wire is usually drawn continuously at speeds ranging from 500 to 2000 feet per minute.

The nature and the amount of lubricant which should be applied to the wire before it is drawn depend upon such factors as the following: the composition of the metal, the initial diameter of the wire or rod, the extent of reduction in diameter caused by the drawing, the speed of drawing, the geometric design of the die, the metallurgical composition of the die, the use to which the drawn wire will be put, the surface finish of the wire prior to drawing, and the nature of the coating, if any, on the wire prior to drawing.

As the wire is drawn continuously through the lubricant, a small amount of lubricant is deposited on the wire before it enters the die; but, a certain amount is also carried into an elongated conical opening of the die within which it is subjected to friction with the wire and the wall of the elongated opening, as the wire travels through the opening which is of sufficient length and adequate gradual reduction in cross-section to cause the friction to develop a pressure to force the lubricant in quantity between the wire and the die in the deforming or reducing zone of the die. The quantity of lubricant forced into the deforming zone is particularly large if certain types of die called pressure dies are used. These dies and die geometry in general are described in U.S. Pat. Nos. 2,349,652, 3,080,962, 3,641,795 and 3,763,680, the disclosures of which are hereby incorporated herein by reference. Also described in these U.S. patents is the effect of die design on the degree of lubrication, drawing force, temperature of the wire, and stress distribution in the wire.

There are, broadly speaking, two classes of lubricants employed in the drawing of wire: liquids and powders. Liquids are used when drawing fine metal wires and they are frequently used when drawing all sizes of wires made from softer metals, such as aluminum and copper, as opposed to steel. Powders are used when drawing steel wires, except if they are very fine. The higher the carbon content of the steel, the greater the necessity for using a powdered lubricant, because greater force is required to draw high carbon steel wire. Chapter 6 of Volume 1 of the Steel Wire Handbook, edited by A. B. Dove, 1969 published by The Wire Association, Conn., U.S.A., provides a description of many of the different types of wire drawing lubricants. U.S. Pat. Nos. 3,961,511 and 4,168,241 refer to powdered lubricants that are used in drawing wire.

In the case of powdered lubricants, the heat and pressure of the drawing operation transforms the lubricant or, when the wire is coated with a carrier such as lime, the mixture of lubricant and carrier, into a plastic film which serves to reduce substantially the friction of cold work and minimize metal to metal contact.

Usually, the wire or rod prior to drawing has a thin coating of lime, borax or phosphate on its surface, for example, the lime coating is the result of passing the wire through a lime bath to neutralize the residual acid left on it subsequent to pickling and water washing. These coatings act as a carrier for powdered lubricants to an extent which depends on such factors as coating thickness, coating composition, and particle size of the lubricant.

Sometimes, the wire, especially steel wire, includes a coating of a metal on a metal wire core, such as zinc on a steel core in the case of galvanized wire, lead on steel core when making certain types of special wire, including music spring wire, and some rope and bridge wires, or copper on a steel core when drawing very fine wire.

Liquids are not suitable for drawing steel wire, unless the wire is of a low gauge, typically less than 0.018 ins., or the desired reduction in diameter is very small; this is because, the high pressure between the die wall and the wire as the wire enters the deforming or reducing zone of the die completely wipes away the liquid lubricant adhering to the wire, and thereby prevents the lubricant from reducing the frictional forces as the wire passes through the die.

A powdered lubricant is generally not suitable for drawing fine wires or wires composed of softer metals; this is because the use of a powdered lubricant produces a rough surface on the wire subsequent to drawing. Furthermore, lubricant consumption would be very high because of all the powdered lubricant that would be drawn through the die with the wire.

In addition to liquid and powdered lubricants, there are other lubricants intermediate in nature, i.e., pastes and greases. These generally comprise solids dispersed in water or an organic vehicle such as mineral oil.

Most of the liquid lubricants comprise a solution of a water-soluble soap in water along with smaller amounts of additives, such as graphite, corrosion preventatives, antioxidants, sequestering agents, bacteriocides and thickeners.

When a liquid lubricant is employed, the die through which the wire passes is submerged in the liquid and so the wire is surrounded by lubricant as it enters the die.

The solid or powdered lubricants are used in the form of a coarse powder, the average particle size of which is typically about 0.125 ins. in diameter.

On the basis of chemical composition, these powdered lubricants fall into two classes. One class consists of products which are based on sodium soaps. Most of these products comprise approximately 80%, by weight, of a sodium soap with the remainder consisting of various other ingredients, such as borax, lime, and sodium nitrite. The other class contains products which are based on calcium soaps with various amounts of lime fused into them. The lime content determines the thickness of the drawn lubricant film. The thickest film is usually produced with lubricants containing about 75%, by weight, of lime. The fused mixture of lime and calcium soap, generally calcium stearate, usually comprises about 80%, by weight, of the composition with the remainder consisting of mixtures of such products as borax, molybdenum disulphide, sulphur, mica and aluminum stearate.

When a powdered lubricant is employed in drawing wire, it is placed in a box, called a die box. The wire being drawn passes through this box. Where the wire enters the box, there is a hole; but where the wire exits from the box, it passes through a die. Before the wire enters the die, it must pass through the powdered lubricant contained in the box. On doing so, a thin coating of powdered lubricant is deposited on the wire, so that when the wire enters the die it is well lubricated. It is important, therefore, that the powdered lubricant be of such a particle size and particle size distribution that it will tend to build a thin coating of itself on the wire.

It is important that the powdered lubricant have good flow properties; otherwise, as the lubricant is gradually consumed, tunnelling will occur, which will result in the wire not picking up any lubricant. This flowability is determined by such factors as particle size, particle size distribution, and particularly by the basic slipperiness of the surface of the lubricant particles.

Frequently, after the wire drawing operation, it is necessary to anneal the wire and, generally when this is the case, it is desirable that the lubricant be completely or at least almost completely burned off during the anneal. From this standpoint, lubricants which produce a low ash on burning are preferable.

There is generally a dust problem associated with the drawing of wire using a powdered lubricant. This dust is created by the small amount of lubricant still on the wire after its emergence from the die; because, instead of staying on the wire, a large portion of this lubricant flies off the wire in the form of dust. This dust creates a nuisance and in the case of certain lubricants, it can present a hazard to health. This is particularly so when the lime content of the lubricant is high.

If one of the ingredients used in making the powdered lubricant were a liquid which did not chemically react when the lubricant was being made, this liquid would tend to be present on the surface of the particles and, because of surface tension and viscosity effects, its presence would lead to a great reduction in flowability of the powder. The extent to which the flowability was reduced would depend upon such factors as the concentration of the liquid, its solubility in the solid lubricant, its viscosity, and its surface tension.

This limitation on the use of liquid ingredients is unfortunate because there are certain liquids which have properties which would be beneficial. For example, one particular liquid additive which is widely used as an ingredient of liquid lubricants based on mineral oil is zinc dihexyldithiophosphate. This material is very effective as an anti-wear additive. Because wear of the wire drawing die is an important factor in the wire drawing industry, it would be highly desirable to be able to add this material to powdered wire drawing lubricants. Die wear is important because such wear leads eventually to the necessity of replacing the die which in turn entails the cost of a new die and also considerable "down time" and labour.

In addition to the zinc compound described above, which is a very good anti-wear additive, there are other metal dialkyldithiophosphates that provide good anti-wear properties. Some of these compounds are also effective oxidation inhibitors. In this regard reference is made to U.S. Pat. No. 4,066,559.

There are also certain liquid additives which are described as being extreme pressure additives which it would be very beneficial to be able to add to a wire drawing lubricant composition. Sulphurized fatty acid esters are good extreme pressure additives. Many liquid chlorinated oils are effective extreme pressure additives and, hence, provide good lubrication. Apparently, during the drawing operation, the heat generated causes some of the chlorine to be released from the molecule and this chlorine reacts on the surface of the wire to form a compound of unknown composition which promotes lubrication. Analogous mechanisms occur when using other extreme pressure additives. Several liquid fatty acid esters and liquid silicones are also valuable additives. They are good lubricants rather than being anti-wear additives or extreme pressure additives.

Die wear is becoming an increasingly important factor in the economics of wire drawing because a higher proportion of wire or rod is mechanically descaled rather than descaled by acid pickling. Unfortunately, although this change eliminates water pollution, it results usually in a rougher surface on the wire and therefore greater die wear.

Another reason why the limitation regarding the addition of liquids is unfortunate is that the presence of a liquid should reduce the amount of dust generated from the wire as it leaves the die. In particular the liquid would tend to bind the particles of lubricant together on the surface of the wire and thereby reduce the number that leave the surface to form dust.

A problem also exists if it is desirable to add certain liquid ingredients to the liquid, water based lubricants that are employed in drawing of fine wires. Some of these liquid additives cannot be employed because it is difficult to form a stable emulsion of the additive in water. If the liquid ingredient is not present in the entire liquid lubricant in a uniform concentration, but instead is concentrated at the surface of the reservoir, then of course very little, if any, will find its way to the surface of the wire.

SUMMARY OF THE INVENTION

In one aspect of the invention there is provided a lubricant composition for use in a wire drawing operation comprising a wire drawing lubricant intimately admixed with an additive comprising a microencapsulated liquid, said liquid being effective to enhance the wire drawing operation.

In another aspect of the invention there is provided a method of drawing a metal wire comprising feeding a metal wire through a lubricant composition to form a coating of the composition on the wire, and drawing the coated wire through a die effective to reduce the cross-sectional area of the wire, the composition comprising a lubricant and a microencapsulated liquid, said liquid being effective to enhance the wire drawing operation.

In yet another aspect of the invention there is provided microcapsules containing a liquid effective to enhance wire drawing.

In still another aspect of the invention there is provided a process for producing a wire drawing lubricant composition which comprises mixing a wire drawing lubricant with a microencapsulated liquid effective to enhance a wire drawing operation.

The lubricant with which the microcapsules are mixed may be a liquid, paste or dry powder.

It has been found that many of the potentially useful liquid additives can be microencapsulated and that by adding the microencapsulated liquid additive rather than the unencapsulated liquid to a powdered or particulate lubricant, the disadvantages associated with adding a liquid to a powder are avoided, and the microencapsulated liquid does not interfere with or reduce the flowability of the powdered lubricant.

Similarly, when a microencapsulated liquid additive is mixed with a liquid wire drawing lubricant, for example, a water-based or oil-based lubricant, the microcapsules generally distribute themselves uniformly throughout the liquid lubricant. As previously mentioned, this frequently does not occur when the liquid additive is added by itself to the liquid lubricant, unless the liquid additive is soluble in the liquid lubricant or unless the liquid additive forms a stable emulsion with the liquid lubricant.

In the case of particulate lubricant compositions of the invention, the microcapsules tend to coat the surface of the wire prior to its entry into the die. As the wire enters the die, the capsules are crushed and the liquid additive is released to perform its beneficial effect as the wire is being drawn through the die. A similar mechanism operates in the case of microcapsules which have been added to a liquid lubricant.

Many microcapsules which are not actually coating the wire as it enters the die will, nevertheless, be drawn into the conical opening zone of the die that precedes the deforming zone of the die, and these capsules will be broken as a result of the pressure induced by the channeling effect. Much of the liquid expelled will become an integral portion of the lubricant film or coating on the wire as it passes through the deforming zone of the die.

In this specification the term "wire" refers to a wire or rod of metal which is to be drawn through a die or series of dies to reduce its cross-sectional dimension, for example, diameter and in particular reduces the cross-sectional dimensions to a desired dimension. As such the term "wire" refers both to a metal rod which has not been subjected to a wire drawing operation, and to wire which has been subjected to a wire drawing operation.

The wire may be of any cross-sectional shape, but generally will be of regular cross-section, and most usually will be circular.

LUBRICANT COMPOSITION

The lubricant composition of the invention comprises a wire drawing lubricant and discrete pressure rupturable microcapsules. The wire drawing lubricant may be particulate, liquid or semi-liquid, for example, a paste or grease and may be composed of a number of ingredients as is conventional, including ingredients which are not in themselves lubricants but which are conventionally employed in lubricants for wire drawing.

Suitable particulate lubricants include metal salts of fatty acids, for example, sodium stearate and calcium stearate; suitable liquid lubricants comprise aqueous solutions of water-soluble soaps, for example, sodium oleate.

In the case of particulate lubricants, the lubricant composition is desirably free-flowing.

The microcapsules comprise a liquid core and a solid shell surrounding the core. The microcapsules are employed in the composition in a concentration to provide an amount of the liquid core effective to enhance the wire drawing operation. In general the liquids to be microencapsulated are very effective at low concentrations and no increase in the improvement is conferred by adding more than a usually small amount of the microcapsules to the lubricant to form the composition. Suitably the microcapsules are employed in a concentration of about 0.01 to 10%, and preferably 0.1 to 5%, by weight, based on the weight of the lubricant in the lubricant composition, excluding any water that might be present in the lubricant.

The lubricant composition may include a mixture of microcapsules having different core liquids to perform different functions. In addition the microcapsules may have a core comprising a mixture of different liquids, performing different functions, providing the liquids are inert to each other, in the sense that they do not react with each other or otherwise interfere with each others performance.

MICROENCAPSULATED LIQUID

In accordance with the invention the liquid core of the microcapsules is a microencapsulatable liquid which is effective to enhance the wire drawing operation. The liquid is not necessarily a lubricant and liquids having a wide variety of functions, which are beneficial in the wire drawing operation, can be employed. The liquid core may suitably comprise one or more materials which provide increased lubrication, or reduce wear at the die or reduce oxidation of the lubricant, or reduced corrosion subsequent to drawing or which promote binding of a particulate lubricant to itself and to the wire subsequent to drawing thereby preventing dust generation or a combination of these properties, or the liquid may be a load carrying additive.

Only certain liquids can be microencapsulated by the microencapsulation techniques available. Furthermore, only those liquids can be employed which do not dissolve the shell or slowly diffuse through the shell of the formed microcapsules.

The proportion of liquid present in the microcapsules should be as great as possible, because the shell material itself confers very little, if any beneficial lubricating properties. Large amounts may be employed, provided difficulties are not encountered in the formation of a continuous shell, and the shell is sufficiently strong. Usually, the liquid content varies between 50% and 90%, preferably 50% to 85%, by weight, of the microcapsules.

It has been found to be possible and advantageous to microencapsulate many liquid additives which are beneficial in wire drawing operations.

Liquid lubricants, for example, fatty acid esters, may be encapsulated. Other liquids that are frequently used as additives for lubricants are themselves not particularly good lubricants may be microencapsulated. Some of these are employed primarily for their physical behavior; for example, dispersants, viscosity index improvers and pour point depressants. Others are employed for their chemical performance; for example, anti-wear additives, and extreme pressure agents which are referred to hereinafter as load carrying additives.

Load carrying additives are described in Anti-wear and Extreme Pressure Additives for Lubricants, Tribology, August 1979, pages 145 to 152, E. S. Forbes, the disclosure of which is incorporated herein by reference. Load carrying additives are particularly important in wire drawing operations. They reduce destructive metal-to-metal contact. These additives react with the mating metal surfaces of the wire and die to form a solid film of a phosphide, sulphide, or chloride, depending upon the chemical nature of the additive used, and such a film provides a lower shear strength and friction than that of the asperities of the contacting metal surfaces. If a load carrying additive is not employed, local welding can occur resulting in the removal, as by tearing out, of metal from the surface of the wire or, far worse, from the surface of the wire drawing die. Many chemicals have been found to be effective load carrying additives. For example, metal organic dithiophosphates are valuable. Especially valuable are certain zinc dithiophosphates. The alcohol on which the dithiophosphate is based is important. A dithiophosphate based on a secondary alcohol, from which controlled release of the sulphur is achieved, is excellent for imparting anti-wear properites. Zinc dihexyldithiophosphate is particularly effective.

Load carrying additives include certain chlorinated oils, sulphur bearing organic materials in which the sulphur is loosely combined so that metal sulphides can form, and organic phosphates and phosphites. Frequently, the greatest effectiveness is achieved by combining two or more of these materials. Certain lead soaps are also effective. The most commonly used organic phosphates are the triaryl phosphates, for example, tricresyl phosphate. Sulphurized sperm oil, sulfochlorinated animal and vegetable oils, metal dithiocarbamates and polychloronaphthyl alkyl xanthates are other examples of load carrying additives.

In the case of the chlorinated oils, which are particularly preferred, such oils are described at page 151 in the aforementioned article of Forbes. Suitably the chlorinated oils have a chlorine content in the range of about 30 to 70%, by weight, and may be animal, mineral or vegetable oils, mineral oils are particularly preferred. The more labile the C—Cl bond in the oil, the greater are the load carrying properties.

The chlorinated mineral oils may be of the paraffinic or naphthenic variety, and sulphochlorinated oils may also be employed.

The addition of an oxidation inhibitor can be helpful under certain circumstances. Many amine and phenolic derivatives, such as ditertiary butyl paracresol are effective oxidation inhibitors; so are certain sulphur compounds, phosphorous compounds, and compounds in which both sulphur and phosphorous are present. Some materials which act as good anti-wear additives and extreme pressure additives are also effective anti-oxidants, for example, zinc dihexyldithiophosphate.

An especially useful load carrying additive which can be microencapsulated in accordance with the invention, comprises a mixture of chlorinated oil, particularly chlorinated mineral oil, tricresyl phosphate and zinc dihexyldithiophosphate.

Corrosion inhibitors constitute another type of additive. Many of these are barium or calcium salts of sulfonates. Rust inhibitors represent one class of corrosion inhibitor. Rusting on iron surfaces can often be inhibited by high molecular weight carboxylic acids, sulfonic acids, or phosphoric acids, the amine salts of these, and aliphatic amines.

There are certain other lubricant additives which occasionally confer beneficial properties when added to wire drawing lubricants and some of these are liquids that can be microencapsulated, for example: dispersants (for example, polyacrylates); detergents (for example, calcium petroleum sulfonates); viscosity index improvers (for example, polyisobutylenes and polymethacrylates); and pour point depressants (for example, certain polyalkyl naphthalenes).

In so far as these various liquids are beneficial in the wire drawing operation, and are microencapsulatable to form stable microcapsules, they are liquids effective to enhance the wire drawing operation and can be employed as the core of microcapsules in the invention.

The invention is particularly concerned with load carrying additives and almost all of these are liquids that can be microencapsulated in accordance with this invention.

In the case of the metal dihexyldithiophosphates it is believed that these compounds function by thermally decomposing in the high stress regions where the surface temperature is high. Dihexyldithiophosphates of other metals, such as iron or nickel, are just as effective as the zinc compound and equally unstable, thermally decomposing violently and completely at about 200° C. Other zinc alkyldithiophosphates having $C_3$ to $C_6$ straight-chain and branched alkyl groups which decompose at a temperature up to about 250° C. are also effective. But, if the thermal stability of zinc dithiophosphate is increased to 290° C. by using a $C_{13}$ alcohol, or to greater than 370° C. by using an aromatic alcohol in the preparation of the dithiophosphate, then these additives have absolutely no effect at all on wear in a valve train experiment; although, they might still be effective in a wire drawing experiment. Any additive which reduces the wear at all of the wire drawing die is, of course, extremely valuable.

Preferred load carrying additives are: metal dialkyldithiophosphates, in which the alkyl groups may be the same or different, straight chain or branched, and each has 1 to 6 carbon atoms, and which decompose at elevated temperatures up to about 250° C., and triaryl- or diaryl phosphates, in which each aryl group which may be the same or different, each aryl being selected from phenyl and substituted phenyl, suitable substituents on the phenyl being lower alkyl of 1 to 6 carbon atoms, lower alkoxy of 1 to 6 carbon atoms, hydroxyl and halogen. Each phenyl group may be substituted one or more times by different substituents.

In general, any liquid will serve to reduce the extent of dusting during drawing when it is microencapsulated and added to a particulate wire drawing lubricant. However, those liquids which are high in viscosity tend to be particularly effective in this regard. Therefore, high viscosity liquids are useful as the core in the microcapsules of the invention.

Many liquid fatty acid esters are effective lubricants and have the advantage that they burn off completely during annealing. In the present invention it is possible to reduce a portion of the ash producing portion of the base lubricant by replacing part of the base lubricant with a microencapsulated liquid fatty acid ester. Both naturally occurring and synethetic liquid fatty acid esters may be employed in this invention.

SHELL

The shell of the microcapsules should have physical properties satisfying several criteria.

Following the drawing of the wire, a certain amount of the shell material of the microcapsules will be in contact with the surface of the wire. For this reason, the material constituting the shell should not be corrosive to the metal.

Generally, it is desirable to clean the wire subsequent to drawing and therefore the shell material should be readily removable from the drawn wire. Different methods are used in the wire drawing industry to clean the wire. If the wire will be cleaned by heating, it is only necessary that the shell material be heat degradable; however, if the wire is cleaned by a washing method, then the shell material must be susceptible to being washed off the wire.

The shell material should not be of a sticky or tacky nature; otherwise, when the microcapsules are mixed with a dry powder wire drawing lubricant, the powder will stick to the shells and this will result in greatly reduced flowability of the admixture of microcapsules and particulate lubricant.

Suitably the shell has a smooth, slippery outer surface particularly when the microcapsules are to be employed with a particulate lubricant; a smooth surface promotes good flowability in the lubricant composition.

If the microcapsules are added to an aqueous liquid lubricant, then the shell material must be resistant to water. It must neither be dissolved by water nor seriously softened by immersion in water.

The shell material should not be degraded by moisture or oxygen in the air, and should be sufficiently abrasion-resistant so that the microcapsules can be thoroughly mixed with a particulate lubricant without release of the microencapsulated liquid.

The shell should not react with and should be impermeable to the liquid core.

A further requirement is that the shell should rupture when subjected to the pressure exerted during the wire drawing operation. It is also desirable that the shell material be such that thin shells can be utilized, so that the percentage of liquid is high. Shell thickness is usually in the range of 0.01 to 50 microns, preferably 0.1 to 20 microns, depending on the capsule size.

The shell is preferably formed by polymerization or copolymerization techniques for the manufacture of microcapsules and is thus polymeric in nature. The preferred shells are derived from the polymerization of a di- or poly-isocyanate with a di- or poly-amine.

In general the shell suitably comprises a thin non-atmospherically-degradable polymeric material, the shell being impermeable to the liquid core and having a smooth, slippery, non-tacky, outer surface having a high resistance to abrasion by particulate lubricants or to dissolution by liquid lubricants, or both, the sheel being rupturable when subjected to the pressure exerted at the die-wire interface during the wire drawing operation.

MICROCAPSULES

The size and shape of the microcapsules are important. If the microcapsules are too large, they will tend to segregate from a particulate or liquid lubricant with which they are mixed. In the case of admixtures with particulate lubricants, most of the microcapsules should preferably be not larger than 2000 microns in diameter to avoid segregation. In the case of microcapsules admixed with a low viscosity liquid lubricant, all the microcapsules should preferably not be larger than 200 microns in diameter to avoid significant settling out of the microcapsules. In general, the finer the capsule size the better, because this leads to a more uniform distribution of microcapsules and, therefore, encapsulated liquid within the admixture of microcapsules and particulate or liquid lubricant. A uniform or homogeneous composition produces a more uniform surface film on the wire. This is desirable because the less the surface properties vary in anti-wear and lubrication properties, the better. For example, it is certainly undesirable to have very little, if any, anti-wear agent on one area of the wire and an excess amount on another.

If the microcapsule size is very fine, then segregation can occur in the case of the microcapsules being admixed with a particulate lubricant; furthermore, extreme fineness will result in dustiness, which in turn creates a nuisance and results in the loss of product.

A spherical shape is most desirable, because this leads to the greatest flowability when the microcapsules are admixed with a particulate lubricant.

Typically the microcapsules have a size in the range of about 1 to 200, particularly 5 to 100 microns.

MICROCAPSULE PRODUCTION

There are several methods of microencapsulating a liquid and most of these can be applied to the microencapsulation of the fliquids concerned here. U.S. Pat. Nos. 2,800,457, 3,041,288 and 3,201,353 involve the formation of a shell by the precipitation of gelatin; in U.S. Pat. No. 3,137,631, other proteins are used to form the shell. Precipitation of synthetic polymers is employed in U.S. Pat. No. 3,173,878 to produce this shell. U.S. Pat. No. 2,969,330 entails shell formation by the polymerization of a monomer at the interface of an oil and water in which the oil is emulsified. In U.S. Pat. No. 3,796,669, the shell formation is by the copolymerization of two monomers in an emulsion of oil and water.

Although encapsulation methods using gelatin are the most popular and have been thoroughly investigated, they are not particularly suitable for the microcapsules of the invention because, in addition to other reasons, the gelatin shells are soluble in water and the surfaces are often tacky.

U.K. Pat. No. 950,443 and U.S. Pat. No. 3,577,515 involve a method which is similar to that preferred in the present invention. In this case, microcapsules are formed by a condensation polymerization reaction between a monomer which is soluble in a water phase and a monomer soluble in a water immiscible phase. The microencapsulated method preferred in this invention is described in U.S. Pat. No. 4,106,932, the teaching of which is hereby incorporated by reference, and involves the polymerization of a di- or poly-isocyanate with a di- or poly-amine.

The liquid that is microencapsulated should be inert to and not interfere with the polymerization. In this respect, fatty acids should be avoided as the liquid when an isocyanate-amine reaction is employed, because the fatty acids and amines tend to react together preventing or hindering the formation of microcapsules, and the fatty acid can also react with theisocyanate. In addition to fatty acids, compounds bearing reactive hydroxyl groups cannot be microencapsulated by the isocyanate-amine reaction because hydroxyl groups react with the isocyanate. Similarly, if the liquid to be microencapsulated is composed of molecules bearing amine groups, the liquid cannot be microencapsulated using the isocyanate-amine reaction.

WIRE DRAWING OPERATION

The wire drawing method of the invention can be carried out in a manner similar to that described above in the Description of the Prior Art.

The wire is fed through a lubricant composition of the invention, comprising a lubricant and the discrete pressure-rupturable microcapsules. Thus in the case of a particulate lubricant, the lubricant composition is contained in a die box, the wire enters the box through a hole on one side of the box and exits the box through a die in an opposite side of the box. In the case of a liquid lubricant, the die is immersed in the liquid lubricant composition which comprises the liquid lubricant having the microcapsules dispersed therein.

The wire is suitably fed through the lubricant composition at a speed of 500 to 2000 ft./min.

A coating of the lubricant composition is formed on the wire as it is fed through the composition. The coating is preferably formed as an essentially uniform coating over the whole surface of the wire. The microcapsules are allowed to rupture as the wire enters the die, more particularly the zone of the die which comprises the lubricating and deforming zones of the die, in the latter of which the cross-sectional area of the wire is reduced, thereby releasing the liquid core. In this way the liquid core is released at precisely the site that it is needed.

The rupture of the microcapsules may result from their being crushed between the die surface and the wire, between the die surface and particulate lubricant in the composition, between the wire surface and particulate lubricant in the composition or as a result of a combination of these actions.

In the case where the lubricant composition comprises a dispersion of microcapsules in a liquid lubricant the rupture will take place as a result of the microcapsules being crushed between the die surface and the wire.

The wire may be fed continuously through a succession of dies each effecting a further reduction in the cross-sectional area of the wire. In each case the wire is suitably fed through a lubricant composition of the invention to form a coating thereon.

The method of the invention can be employed to draw wires of soft metals, for example, aluminum and copper, as well as steel, as well as two component metal wires, including a metal core and a metal coating.

A lubricant composition of the invention which comprises a liquid lubricant is employed for drawing fine wires and all sizes of wire from soft metal; and a lubricant composition of the invention which comprises a particulate lubricant is, in general employed for steel wires, particularly high carbon steel wires. In general a semi-liquid, paste or grease lubricant is employed in a lubricant composition of the invention for intermediate cases, for example, low carbon steels where the desired wire is not too fine.

DESCRIPTION OF PREFERRED EMBODIMENTS

The following Examples serve to illustrate the invention, but they are not intended to limit it thereto.

EXAMPLE 1

A Mixture of Zinc Dialkyldithiophosphate and a Triarylphosphate Microencapsulated in the Reaction Product from Ethylenediamine and Polymethylene Polyphenylisocyanate Twenty-six grams of polymethylene polyphenylisocyanate (Mondur MRS, trade mark from Mobay Chemical Company) was dissolved in a solution comprising 32 grams of a zinc dialkyldithiophosphate (Lubrizol 1095, trade mark from Lubrizol Chemical Company) and 64 grams of a triarylphosphate Fryquel 220, trade mark from Stauffer Chemical Company). The solution was added with stirring to a solution of 3 grams of Siponic 218 (trade mark for a polyoxyethylene thioether from Alcolac, Inc.) and 700 grams of water. When the emulsification was complete, the stirring rate was reduced and 10 grams of ethylene diamine dissolved in 70 grams of water was added. The temperature was then increased to 80° C. and maintained constant while the mixture was stirred for 4 hours.

The resulting dispersion of microcapsules in water was filtered and the microcapsules dried at 60° C.

The microcapsules were yellowish, spherical, free-flowing, and had an average particle size of about 100 microns and contained about 75% by weight liquid.

EXAMPLE 2

Zinc Dialkyldithiophosphate and Triarylphosphate Microencapsulated in the Reaction Product from Propylene Diamine and Trimethylhexamethylene Diisocyanate The same procedure was followed as in Example 1, except that 15 grams of propylene diamine were used instead of 10 grams of ethylene diamine and 24 grams of trimethylhexamethylene diisocyanate were used instead of 26 grams of polymethylene polyphenylisocyanate. The microcapsules were dried at 60° C. and disaggregated by sieving through a 20 mesh sieve. They were white, spherical, free-flowing, had an average diameter of about 70 microns, and contained about 75% by weight liquid.

EXAMPLE 3

Testing of Microcapsules Prepared in Examples 1 and 2

The microcapsules prepared in Examples 1 and 2 were tested as additives for a particular customarily used powdered wire drawing lubricant.

The powdered wire drawing lubricant used was Chemdraw 621 (trade Mark from H. L. Blachford, Limited). The approximate composition of this lubricant is 95% by weight sodium stearate, 3% borax, and 2% sodium nitrite. The average particle size of the powdered lubricant was 1/16 in. diameter.

Unfortunately, there is no standard test procedure for measuring the effectiveness of wire drawing lubricants. However, it was found that when 5% by weight of the microcapsules from either Example 1 or from Example 2 were added to Chemdraw 621 and the resulting lubricant composition was used to draw welding grade steel wire from a diameter of 0.217 in. to 0.068 in. at a machine speed of 1500 ft./minute, several improvements were noted over the results obtained as compared with the use of Chemdraw 621 alone. In particular, die life was appreciably longer and, considerably less dust was produced off the wire after it left the dies.

EXAMPLE 4

Effect of the Addition of Microcapsules from Examples 1 and 2 to a Lubricant Used for Drawing Brass Wire In this case, 3% by weight of microcapsules of Examples 1 and 2 were added respectively to Chemdraw 621 to form a lubricant composition. The wire drawn was brass, and it was found that subsequent fabrication of the brass wire into fasteners was facilitated because of the very thin coating of Lubrizol and Fyrquel remaining on the wire.

EXAMPLE 5

The Use of Microcapsules in Wet Drawing

The same procedure was used to prepare the microcapsules as presented in Example 1, except that the filter cake of microcapsules and water was not dried but, instead, it was added directly to an aqueous soap solution frequently used in drawing fine carbon steel wire. The composition of this lubricant was 70% water, 20% potassium laurate, 5% potassium stearate, 4.9% potassium oleate, 0.05% of a defoaming agent, and 0.05% of a biocide. Enough of the filter cake was added so that the concentration by weight of microcapsules in the liquid lubricant was 0.5% by weight. The addition of the microcapsules resulted in a die life improvement of at least 5%.

EXAMPLE 6

Chlorinated Oil Microencapsulated in the Reaction Product from Ethylene Diamine and Toluene Diisocyanate 11.2 grams of toluene diisocyanate (Nacconate 80, trade mark from Allied Chemical) was dissolved in 85 grams of a chlorinated paraffin oil (Keil CW-35, trade mark from Keil Chemical Company). This solution was added with stirring to a solution of 7 grams of Siponic 218 (trade mark for a polyoxyethylene thioether from Alcolac, Inc.) and 700 grams of water. When the emulsification was complete, the stirring rate was reduced and 6 grams of ethylene diamine dissolved in 44 grams of water was added. The temperature was then increased to 80° C. and maintained constant while the mixture was stirred for 4 hours. After filtering, drying, and breaking up the aggregates of microcapsules, it was noted that the microcapsules were white, spherical, free-flowing, and had an average particle size of about 95 microns and contained about 85% by weight chlorinated paraffin oil.

EXAMPLE 7

Soyabean oil Encapsulated in the Reaction Product from Ethylenediamine and Toluene Diisocyanate 30 g. of toluene diisocyanate was dissolved in 60 g. of soyabean oil (from Canlin Limited). This solution was added with stirring to a solution of 3 g. of Siponic 218 (trade mark) in 700 g. of water. When the emulsification was complete, the stirring rate was reduced and 30 g. of ethylenediamine dissolved in 70 g. of water was added. The temperature was then increased to 80° C. and maintained constant while the mixture was stirred for 4 hours.

The microcapsules were separated from the water by filtration and then dried at 60° C.

The microcapsules were white, spherical, free-flowing and had an average diameter of 50 microns, and contained about 60% by weight soyabean oil.

EXAMPLE 8

Rapeseed oil Encapsulated in Polymerized Divinylbenzene 25 g. of divinylbenzene were dissolved in 60 g. of rapeseed oil. This solution was added with vigorous stirring to a solution of 0.5 g. of Siponic 218 in 700 g. of water. When the emulsification was complete, the stirring rate was reduced and the temperature raised to 80° C. Then, 2 g. of potassium persulphate were added and the mixture stirred at 80° C. for 6 hours. The temperature was allowed to drop to 25° C. At this point the mixture was filtered, and the microcapsules washed and then dried at 45° C. The dried capsules were gently ground to break any aggregates.

The final microcapsules were white, spherical, free-flowing, had an average particle size of 20 microns and contained approximately 70% by weight of rapeseed oil.

EXAMPLE 9

Epoxidized Soyabean Oil Encapsulated in the Reaction Product from Triethylenetetramine and Polymethylene Polyphenylisocyanate 19.6 g. of polymethylene polyphenylisocyanate (Mondur MRS, trade mark from Mobay Chemical Company), was dissolved in 75.0 g. of epoxidized soyabean oil (Plastolein 9232, trade mark from Emery Industries, Inc.), together with 3.0 g. of a tallow fatty acid diester of polyethylene glycol of molecular weight 600. The solution was added with vigorous stirring to 700 ml. of water. When the emulsification was complete, the stirring rate was reduced and 10.0 g. of triethylenetetramine dissolved in 100 ml. of water was added. The mixture was heated to 80° C. for 2 hours with continued stirring, cooled, and filtered. The microcapsules were dried at 60° C. and disaggregated by sieving through a 60 mesh sieve. They were white, spherical, free-flowing, had an average diameter of about 70 microns, and contained about 75% by weight of oil.

EXAMPLE 10

A Mixture of Dibutyl Phthalate and Sulphurized Lard Oil Microencapsulated in the Reaction Product from Ethylenediamine and polymethylene Polyphenylisocyanate 19.6 grams of Mondur MRS was dissolved in a solution comprising 30 grams of dibutyl phthalate and 45 grams of sulphurized lard oil (Mayco Base 1208, trade mark from Mayco Oil & Chemical Company, Inc.). The solution was added with stirring to a solution of 3 grams of Siponic 218 in 700 grams of water. After emulsification was complete, 7 grams of triethylenetetramine in 43 grams of water was added. The temperature was then increased to 80° C. and held constant while the mixture was stirred for 4 hours.

The resulting dispersion of microcapsules in water was filtered and the microcapsules dried at 60° C.

The microcapsules were yellowish, spherical, free-flowing, and had an average particle size of about 20 microns.

I claim:

1. A lubricant composition for use in a wire drawing operation, comprising a wire drawing particulate lubricant intimately admixed with an additive comprising a microencapsulated liquid, said liquid being a load carrying additive effective to enhance the wire drawing operation.

2. A composition according to claim 1, in which said microencapsulated liquid comprises discrete pressure rupturable microcapsules in a concentration of 0.01 to 10%, by weight, based on the weight of the lubricant.

3. A composition according to claim 2, wherein said liquid is selected from the group consisting of metal dialkyldithiophosphates, in which the alkyl groups, which may be the same or different, are straight chain or branched groups of 1 to 6 carbon atoms, which decompose at elevated temperatures up to about 250° C.; triaryl phosphates in which the aryl groups, which may be the same or different are unsubstituted or substituted phenyl groups; chlorinated oils and mixtures thereof.

4. A composition according to claim 2, wherein said liquid is selected from the group consisting of zinc dialkyldithiophosphate, in which each alkyl group, which may be the same or different, straight or branched, has 4 to 6 carbon atoms, tricresyl phosphate, chlorinated mineral oils, and mixtures thereof.

5. A composition according to claim 2, wherein said microcapsules are substantially spherical having a diameter of 1 to 200 microns, the liquid being encapsulated in a microcapsule shell having a thickness of 0.01 to 50 microns, the shell comprising a non-atmospherically-degradable polymeric material, impermeable to the liquid and having a smooth, slippery outer surface, having a high resistance to abrasion by the particulate lubricant, and being rupturable when subjected to pressure exerted at the die-wire interface during the wire drawing operation.

6. A composition according to claim 5, wherein said load carrying additive comprises 50 to 90%, by weight, of the microcapsules.

7. A composition according to claim 2, wherein said liquid is selected from the group consisting of extreme pressure additives, anti-wear additives, and mixtures thereof.

8. A composition according to claim 2, wherein said liquid comprises a mixture of zinc dihexyldithiophosphate, tricresyl phosphate and chlorinated mineral oil.

9. A composition according to claim 1, wherein said liquid is effective to reduce wear at a wire drawing die.

10. A method of drawing a metal wire comprising feeding a metal wire through a lubricant composition comprising a particulate lubricant and discrete pressure rupturable microcapsules having a liquid core, to form a coating of the composition on the wire, drawing the coated wire through a die effective to reduce the diameter of the wire, and allowing the microcapsules to rupture to release said liquid at the die, said liquid being a load carrying additive effective to enhance the wire drawing operation.

11. A method according to claim 1, wherein said liquid is selected from the group consisting of extreme pressure additives, anti-wear additives, and mixtures thereof.

12. A method according to claim 10, in which said microencapsulated liquid comprises discrete pressure rupturable microcapsules in a concentration of 0.01 to 10%, by weight, based on the weight of the lubricant.

13. A method according to claim 12, wherein said liquid is selected from the group consisting of metal dialkyldithiophosphates, in which the alkyl groups, which may be the same or different, are straight chain or branched groups of 1 to 6 carbon atoms, which decompose at elevated temperatures up to about 250° C., triaryl phosphates in which the aryl groups, which may be the same or different, are unsubstituted or substituted phenyl groups, chlorinated oils and mixtures thereof.

14. A method according to claim 12, wherein said load carrying additive comprises 50 to 90%, by weight, of the microcapsules.

15. A method according to claim 12, wherein said liqiuid core is selected from the group consisting of zinc dialkyldithiophosphate in which each alkyl which may be the same or different, straight or branched chain, contains 4 to 6 carbon atoms, tricresyl phosphate, chlorinated mineral oils and mixtures thereof.

16. A method according to claim 10, wherein said capsules are substantially spherical having a diameter of 1 to 200 microns, the liquid being encapsulated in a microcapsule shell having a thickness of 0.01 to 50 microns, the shell comprising a non-atmospherically-degradable polymeric material, impermeable to the liquid and having a smooth, slippery outer surface, having a high resistance to abrasion by the particulate lubricant, and being rupturable when subjected to pressure exerted at the die-wire interface during the wire drawing operation.

17. A method according to claim 16, wherein said liquid is effective to reduce wear at the wire drawing die.

18. A method according to claim 10, wherein said liquid is effective to enhance lubrication at the die-wire interface.

19. A method according to claim 10, wherein said liquid is effective to reduce wear at the die.

20. A method according to claim 10, wherein said liquid is effective to reduce dust generation subsequent to drawing.

21. A method according to claim 10, wherein said liquid comprises a mixture of zinc dihexyldithiophosphate, tricresyl phosphate and chlorinated mineral oil.

22. A method according to claim 10, wherein said microcapsules are substantially spherical having a diameter of 1 to 200 microns and said liquid comprises 50 to 90%, by weight, of the microcapsules, the liquid being selected from the group consisting of zinc dihexyldithiophosphate, tricresyl phosphate, chlorinated mineral oils and mixtures thereof.

* * * * *